March 26, 1968  J. H. SCHILDMEIER  3,374,688

VIBRATION DAMPER SYSTEM

Filed Oct. 21, 1965

INVENTOR.
John Henry Schildmeier
BY
Lockwood, Woodard, Smith, & Weikart
Attorneys United States Patent Office 3,374,688
Patented Mar. 26, 1968

3,374,688
VIBRATION DAMPER SYSTEM
John Henry Schildmeier, 6038 Crows Nest Drive,
Indianapolis, Ind. 46208
Filed Oct. 21, 1965, Ser. No. 499,424
9 Claims. (Cl. 74—424.8)

ABSTRACT OF THE DISCLOSURE

A drapery sizing machine including two parallel drive screws of substantial length and drive nuts thereon to drive a finger box up and down on the frame. A pair of semi-cylindrical shaft supports intermediate the ends of each shaft to prevent whipping, each including a three-section cam follower plate engageable by cam rollers on the drive nut during movement of the nut up or down to enable the nut to pass the support. Return springs constantly urging the supports against the drive screw and returning the supports to contact with the drive screw after the spreading of the supports by the cam and follower during passage thereof by the drive nut.

---

This invention relates generally to machinery employing long rotating shafts, and more particularly to means supporting a shaft against radial deflections at a certain point along the shaft but permitting a member moving along the shaft to pass the support point.

In machine design, there are many instances requiring use of long rotating shafting, and it is naturally necessary to minimize radial shaft movement (deflections transverse to the shaft axis) in order to avoid excessive and uneven bearing loading and resultant damage. There are also other reasons for minimizing shaft deflection particularly, for example, where the shaft is a feed screw.

Shaft deflections, particularly where caused by vibrations resulting from shaft rotation, are affected by rotational speed, shaft diameter, end loading, and distance between bearing points. It is not always convenient to select the first three of these parameters to avoid deflection problems, and heretofore it has been difficult if not impossible in many instances to provide additional bearing points to reduce distance between bearing points, particularly where a member must move along the shaft past a bearing point in order for the machine to function properly.

It is therefore a general object of the present invention to provide means for controlling deflection in long shafts.

A further object is to provide support means permitting passage of the support point by a member moving along the shaft.

A still further object is to provide support means permitting passage by a member which completely encircles the shaft.

A still further object is to provide means capable of controlling deflection both before, during, and after passage of the support point by a member moving along the shaft.

A further object is to provide means achieving the foregoing objects and which can be easily incorporated at minimal cost.

The full nature of the invention will be understood from the accompanying drawings and the following description and claims:

Figure 1:
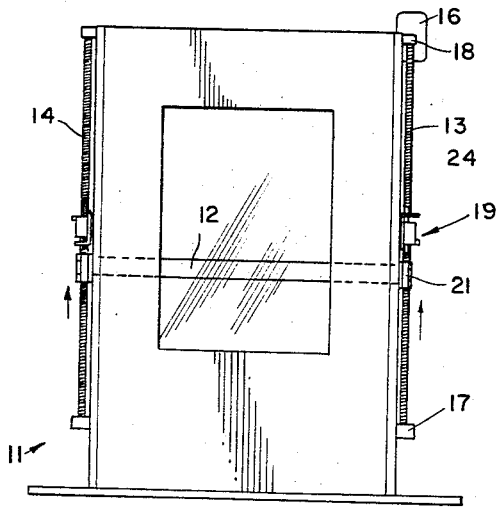
FIG. 1 is a front elevational view of a drapery sizing machine incorporating the present invention.

Referring now to the drawings in detail, the illustrated embodiment of the invention is incorporated in a drapery sizing machine 11 which, in operation is much like that described in U.S. Patent No. 2,699,010 issued to H. D. Reed, Jan. 11, 1955. In the present example, however, the finger box 12 is driven up and down by a pair of vertical drive screws 13 and 14 mounted on opposite ends of the frame, rather than by the chain and sprocket arrangement shown in the Reed patent. The drive is accomplished by providing a drive nut at each end of the finger box 12, with the drive nuts being threadedly received on the drive screws which are operated in unison by a reversible motor 16, for example. Machines of this type are made in larger sizes, depending on the size of the drapes to be handled thereby, so the overall length of the drive screws 13 and 14 can easily exceed 15 feet.

In such machines, it has been found that once the various parameters are selected for the best overall machine design, vibrations are generated in the drive screws as the finger box is driven up and down in the frame. It is possible for the amplitude of horizontal shaft deflection due to these vibrations to reach a magnitude such that early bearing failure at points 17 and 18 can occur. This is handled in the same way for both shafts according to the present invention, so a description of one will suffice for both.

Figure 3:
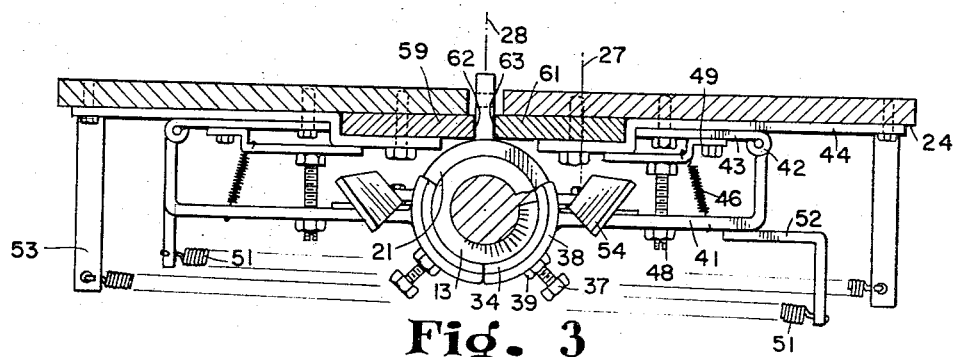
FIG. 3 is a top plan view thereof.

At a point 19 intermediate the bearing points 17 and 18, and which can be equidistant therebetween, a damper is employed according to the present invention. The drive nut 21 threadedly received on drive screw 13 is immediately below the support point in this example, and includes flanges 22 and 23 extending outwardly therefrom in a direction parallel to the right-hand end 24 of the machine frame. Two roller bearings are mounted to each of these flanges, bearings 25 and 26 being mounted for rotation on horizontal axes lying in a vertical plane 27 parallel to a vertical plane 28 (FIG. 3) containing the axes of both the drive screws 13 and 14. For mounting these bearings, a bolt 31, spacer 32, and nut 33 may be employed. The other two bearings are mounted to the drive nut in the same way. These bearings serve as cams, as will be seen shortly.

The damper includes two semicylindrical shell bearings 34 and 36 whose internal radius of curvature is approximately the same as that of the outer surface of the drive screw and these shells are normally positioned so that they just barely contact the outer surface of the drive screw. Because the manner of mounting the one shell is the same as that for the other, the description of one will suffice for both.

Shell 34, which may conveniently be made of a bearing material such as a phenolic threadedly receives the screw 37 passing through a mounting shell 38 and is located securely in place by the lock nut 39. The mounting plate is affixed to a generally L-shaped arm 41 pivotally mounted at the hinge 42 and through the hinge plate 43 to a mounting plate 44 affixed to the end 24 of the machine frame. A return spring 46 hooked through an aperture 47 in the arm and through an aperture in the abutment plate 49, for example, urges the arm toward the machine frame and an adjustable stop screw 48 is threadedly received in the arm and positioned to stop against the abutment plate 49 so that the bearing shell 34 just touches the outer peripheral surface of the drive screw. Accordingly, as the drive nut 21 moves up and down along the screw 13 above or below the bearing shell, any tendency of the shaft to deflect horizontally away from the frame 11 or parallel to the end 24 thereof, is resisted by the bearing shell in contact therewith.

To assist this spring 46 in achieving this function, a spring 51 has one end mounted to a bracket 52 affixed to the arm 41 and has its other end connected to the bracket 53 affixed to the end of the machine frame.

Figure 4:
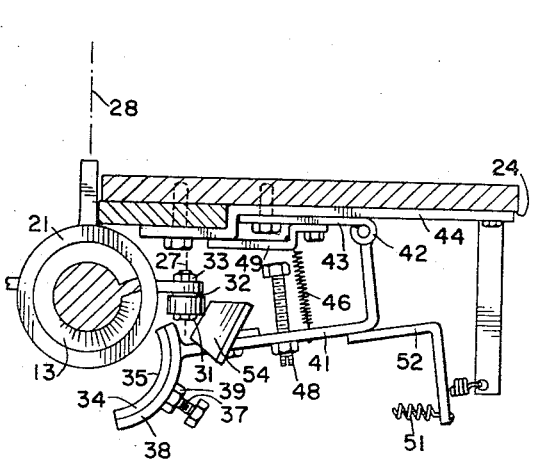
FIG. 4 is a fragmentary top plan view like FIG. 3, but showing the shaft support members cammed outwardly to permit passage of the support point by the drive nut moving along the drive screw.

In order to permit the drive nut 21 to pass the bearing shell and mount assembly as the nut moves up or down along the screw, a cam follower plate 54 is employed and is affixed to the arm 41. This plate includes a first section 56 which extends inwardly toward the drive screw as it extends upwardly from its lower end and then meets the central section 57 which extends parallel to the drive screw from a point below the bearing shell to a point above the bearing shell. A third section 58 like section 56 extends from the upper end of the central section 57, upwardly and outwardly away from the drive screw. This cam follower is engaged first by the roller 26 as the drive nut moves up and reaches a position shown in FIG. 2. Further advance upwardly of the drive nut forces the cam follower outwardly as it travels along the lower section of the plate and when the cam roller 26 reaches the central section 57, the bearing shell has moved out to the point shown in FIG. 4 so that the complete nut and cam roller unit freely passes the bearing shell. Then, as the drive nut moves away, the cam roller 24 engaging the upper cam follower section 58 permits gradual return of the bearing shell to its initial position just touching the drive screw.

Because all three of the cam follower sections are canted so as to somewhat face the end 24 of the machine, they urge the cam rollers and therefore the drive nut and screw slightly inward toward the machine frame. Accordingly, since they face in the same direction as does the inner surface 35 of the bearing shell, they resist deflection of the drive screw in the same direction as does the bearing shell. Accordingly, the drive screw is supported not only when the drive nut is away from its locality, but also when the drive nut is passing the bearing location.

Figure 2:
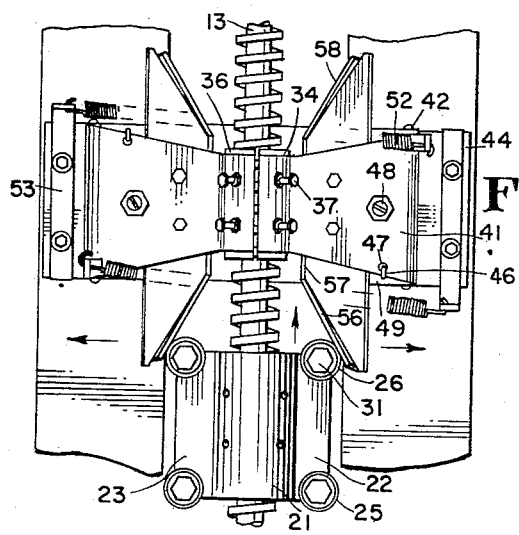
FIG. 2 is enlarged fragmentary elevational view of an end of the machine showing the vibration damper according to a typical embodiment of my invention.

All of the component parts described immediately above, can be turned 180 degrees from their position shown in FIG. 2 and serve to support the bearing shell 36. In other words, the two units completing the shaft support are identical, making for minimum cost and maximum ease of installation.

It is customary in the drapery sizing machine to employ two guide rails 59 and 61 of bearing material, providing a slot 62 therebetween to receive and guide the finger box mounting bar 63 which is affixed to the drive nut and to which the finger box 12 is mounted. Rotation of the drive nut on the drive screw is thus prevented and the present invention minimizes wear which might otherwise occur on the guide slot if shaft deflections were tolerated. The degree of contact of the bearing shells with the drive screw can be adjusted by the adjustable stop screw 48 and its counterpart for the bearing shell 36 so that when the shaft is at rest, there need not be any contact at all so that contact would only occur when vibrations began. The side loading on the shaft which would result from camming only one of the bearing shells is, of course, offset by the camming of the other bearing shell and any net result load toward the machine frame resulting from the canting of the cam surfaces can be minimized by the degree of canting or can be taken by the finger box connected between the drive nuts on both sides of the machine. The use of long and short return springs such as springs 51 and 46, respectively, enables selection of whatever combination of spring rates may be desired to produce the best results depending upon the type of bearing materials used, moment arms with respect to the hinge axis 42, and vibrational energy which can be imparted to the shaft by the driving thereof.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. A vibration damper system comprising:
a frame;
an elongated shaft supported on said frame at spaced points, said shaft having a screw thread thereon extending between said points, and said shaft being motor driven to rotate on its longitudinal axis;
a nut threadedly received on said shaft and constrained against rotation thereon, to be driven along said shaft between said points as said shaft is rotated;
and intermediate support means engaging said shaft and said frame and supporting said shaft between said points, said support means being separable from said shaft temporarily to permit said nut to pass said support means during movement of said nut along said shaft.
2. A vibration damper system comprising:
a frame;
an elongated shaft supported on said frame at spaced points;
a member movable along said shaft between said points;
intermediate support means engaging said shaft and said frame and supporting said shaft between said points, said support means being separable from said shaft temporarily to permit said member to pass said support means during movement of said member along said shaft,
said member including cam means thereon, and said support means including a cam follower thereon engageable by said cam means as said member moves up and down along said shaft past said support means, said follower and thereby said support means being cammed away from said shaft by said cam means as said member approaches adjacent said support means during movement of said member up and down along said shaft,
and return means automatically returning said support means to engagement with said shaft as said member departs from said support means during movement of said member up and down along said shaft.
3. The system of claim 2 further comprising:
spring means connected to said frame and to said support means and urging said support means against said shaft and limiting radial action of said shaft to a maximum predetermined by spring selection.
4. The system of claim 3 wherein:
said follower includes a portion extending upwardly and inwardly toward said shaft and a portion extending upwardly parallel to said shaft and a portion extending upwardly and outwardly from said shaft, all of said portions being engaged in sequence by said cam means during movement of said member up and down along said shaft past said support means whereby said cam and follower are arranged to continue to support said shaft through said member when said follower is cammed away from said shaft.
5. The system of claim 2 wherein:
said support means includes a first semicylindrical shaft contact portion fittingly received on and partially encircling said shaft, said contact portion being mounted to a first arm hinged to said frame, said cam follower being also mounted to said arm, said shaft contact portion being thereby cammed out of the path of said member by said cam means to permit said member to pass said support means as said member moves up and down along said shaft.
6. The system of claim 5 and further comprising:
a second shaft contact portion fittingly received on and partially encircling said shaft, said second contact portion being mounted to a second arm hinged to said frame on an axis generally parallel to the axis of said shaft, said second arm having a second cam follower thereon engageable by said cam means whereby said second contact portion is cammed out of the path of said member in unison with said first contact portion.

7. The system of claim 6 and further comprising:
a first spring connected to said first arm and to said frame and urging said first arm against the camming action, and a second spring connected to said second arm and to said frame and urging said second arm against said camming action, whereby said contact portions are automatically returned to their initial positions immediately adjacent each other and adjacent said shaft when said member has passed said supporting means.

8. In a drapery sizing machine, the combination comprising:
a frame;
a finger box extending across said frame;
first and second vertical drive screws mounted to said frame extending upwardly along first and second opposite ends of said frame;
motor means driving said screws in rotation;
first and second drive nuts threadedly received on said first and second screws respectively, and connected to opposite ends of said finger box for driving said box up and down in said frame as said screws are driven in unison in first and second rotational directions, respectively;
first shaft support means mounted to said frame in the path of said first nut moving along said shaft;
and means responsive to movement of said nut along said shaft to temporarily move said support means out of the path of said nut and thereby permit said nut to pass said support means as said nut moves along said shaft.

9. The combination as set forth in claim 8 wherein:
said first drive nut has a plurality of cam rollers thereon, said rollers having parallel rotational axes and the axes of two of said rollers lying in a first plane parallel to the screw axes and the axes of two more of said rollers lying in a second plane parallel to said shaft axes, a third plane containing the rotational axes of said drive screws being disposed equidistantly between said first and second planes;
said first support means includes a first semi-cylindrical shaft contact portion of a bearing material fittingly received on and partially encircling said shaft, said contact portion being mounted to a first arm hinged to a first end of said frame, to which said first drive screw is mounted, said first arm having a cam follower plate thereon engageable by said first two cam rollers as said nut moves up and down along said drive screw past said contact portion, said plate having three sections beginning with a section substantially spaced from said first drive screw and extending upwardly and inwardly toward said first drive screw and joining a second section substantially parallel to said first drive screw and terminating with a third section beginning at the upper end of said second section and extending upwardly and outwardly away from said first drive screw, whereby said first cam follower plate is in the path of said first and second rollers and is cammed outwardly from said drive screw as said nut moves up and down past said contact portion;

said first support means further including a second shaft contact portion like said first contact portion and mounted to a second arm like said first arm hinged to said frame like said first arm and having a cam follower plate thereon like said first cam follower plate, said first and second arms being hinged to said first frame end on opposite sides of said first drive screw and said contact portions meeting at said third plane, and said cam follower plates being arranged so that their cam following surfaces are disposed to face the said first frame end, whereby any tendency of said shaft to move radially parallel to or outwardly from said first frame end is constrained by said contact portions and said cam follower plates before and during, respectively, the camming outwardly of said arms by said cam rollers.

References Cited

UNITED STATES PATENTS

| | | | |
|---|---|---|---|
| 1,408,280 | 2/1922 | Fahrlander | 74—424.8 |
| 2,308,203 | 1/1943 | O'Farrell | 308—3.9 |
| 2,365,681 | 12/1944 | Gartin | 308—3.9 |
| 3,206,259 | 9/1965 | Curtis | 308—3.9 |

ROBERT M. WALKER, *Primary Examiner.*

LEONARD H. GERIN, *Examiner.*